United States Patent
Qiao et al.

(10) Patent No.: US 12,369,046 B2
(45) Date of Patent: Jul. 22, 2025

(54) WIRELESS COMMUNICATION METHOD AND APPARATUS

(71) Applicant: HUAWEI TECHNOLOGIES CO., LTD., Guangdong (CN)

(72) Inventors: Yunfei Qiao, Hangzhou (CN); Yu Wang, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 18/155,506

(22) Filed: Jan. 17, 2023

(65) Prior Publication Data

US 2023/0156489 A1 May 18, 2023

Related U.S. Application Data

(63) Continuation of application No. PCT/CN2021/105635, filed on Jul. 10, 2021.

(30) Foreign Application Priority Data

Jul. 17, 2020 (CN) .......................... 202010694226.1

(51) Int. Cl.
 *H04W 16/28* (2009.01)
 *H04B 7/08* (2006.01)
 *H04W 36/00* (2009.01)
 *H04W 76/20* (2018.01)

(52) U.S. Cl.
 CPC .......... *H04W 16/28* (2013.01); *H04B 7/0868* (2013.01); *H04W 36/0011* (2013.01); *H04W 36/0055* (2013.01); *H04W 76/20* (2018.02)

(58) Field of Classification Search
 CPC ............ H04W 16/28; H04W 36/0011; H04W 36/0055; H04W 76/20; H04W 36/32; H04W 72/046; H04W 84/06; H04B 7/0868; H04B 7/0695; H04B 7/18513; H04B 7/2041
 See application file for complete search history.

(56) References Cited

U.S. PATENT DOCUMENTS

| | | | |
|---|---|---|---|
| 2019/0053071 A1* | 2/2019 | Ly ......................... | H04W 16/28 |
| 2019/0319823 A1 | 10/2019 | Akkarakaran et al. | |
| 2023/0134803 A1* | 5/2023 | Khoshnevisan ...... | H04W 16/28 370/329 |

FOREIGN PATENT DOCUMENTS

WO 2020030317 A1 2/2020

OTHER PUBLICATIONS

Hu et al., "Performance Analysis of Distributed-Antenna Communication Systems Using Beam-Hopping Under Strong Directional Interference," Wireless Personal Communication, vol. 32, No. 2, Jan. 1, 2005, pp. 89-105.

(Continued)

*Primary Examiner* — Ashley Shivers
(74) *Attorney, Agent, or Firm* — Fish & Richardson P.C.

(57) ABSTRACT

Embodiments of this application provide a wireless communication method and apparatus. In one example method, a first communication apparatus obtains first beam configuration information, determines a first beam hopping pattern based on the first beam configuration information, and communicates with a second communication apparatus based on the first beam hopping pattern.

20 Claims, 4 Drawing Sheets

(56) References Cited

OTHER PUBLICATIONS

Extended European Search Report in European Appln. No. 21841543.8, mailed on Nov. 15, 2023, 16 pages.
International Search Report and Written Opinion in International Appln. No. PCT/CN2021/105635, mailed on Sep. 28, 2021, 15 pages (with English translation).

* cited by examiner

WIRELESS COMMUNICATION METHOD AND APPARATUS

CROSS-REFERENCE TO RELATED APPLICATIONS

This application is a continuation of International Application No. PCT/CN2021/105635, filed on Jul. 10, 2021, which claims priority to Chinese Patent Application No. 202010694226.1, filed on Jul. 17, 2020. The disclosures of the afore-mentioned applications are hereby incorporated by reference in their entireties.

TECHNICAL FIELD

This application relates to the field of communication technologies, and in particular, to a wireless communication method and apparatus.

BACKGROUND

A non-terrestrial communication network (NTN), for example, a satellite communication network, has significant advantages such as global coverage, long-distance transmission, flexible networking, convenient deployment, and being not limited by geographical conditions, and can provide services for both fixed terminals and various mobile terminals. A conventional terrestrial network cannot provide seamless coverage, especially in a place in which no base station can be deployed, for example, sea, desert, or air. Therefore, a non-terrestrial network is introduced into a terrestrial network, for example, a fifth generation (5G) mobile communication system. In the non-terrestrial network, a base station or some base station functions are deployed on a high altitude platform station or a satellite to provide seamless coverage for a terminal device. In addition, the high altitude platform station or the satellite is less affected by natural disasters, thereby improving reliability of the 5G system.

To support wide-area coverage, hundreds or even thousands of beams usually need to be configured for a single satellite, and single-satellite load is large. To alleviate a contradiction between small single-satellite load and a wide coverage area and improve utilization of satellite system resources, a beam hopping satellite communication system emerges correspondingly. Specifically, in the beam hopping satellite system, only a few beams (for example, tens of beams) are configured for a single satellite, and the beams serve all coverage areas of the single satellite in a time division manner. In a beam hopping scenario, how a terminal obtains a beam distribution becomes an issue that urgently needs to be addressed.

SUMMARY

Embodiments of this application provide a wireless communication method and apparatus, so that a user can obtain a beam distribution status, and perform communication based on the beam distribution.

According to a first aspect, this application provides a wireless communication method, including: A first communication apparatus obtains first beam configuration information, determines a first beam hopping pattern based on the first beam configuration information, and communicates with a second communication apparatus based on the first beam hopping pattern.

In the wireless communication method provided in the first aspect of this application, the first communication apparatus can determine the first beam hopping pattern by using the first beam configuration information, and perform communication based on the first beam hopping pattern, so that a beam distribution status is obtained in a beam hopping scenario, thereby ensuring normal communication.

In a possible implementation, that a first communication apparatus obtains first beam configuration information includes: The first communication apparatus receives a radio resource control RRC message sent by the second communication apparatus, where the RRC message includes the first beam configuration information.

The RRC message carrying the first beam configuration information may be a message broadcast by the second communication apparatus. The broadcast RRC message carries the first beam configuration information, so that a beam pattern change caused by satellite motion or beam splitting or combination can be flexibly addressed, and signaling overheads can be reduced.

Alternatively, the RRC message carrying the first beam configuration information may be a user-specific (UE-Specific) message unicast by the second communication apparatus to the first communication apparatus. In a scenario with a few users, a unicast RRC message may be used to carry the first beam configuration information, and corresponding beam configuration information may be delivered to each user.

In a possible implementation, the first beam configuration information includes a beam hopping pattern, and the first communication apparatus determines the first beam hopping pattern based on the beam hopping pattern.

After receiving the first beam configuration information, the first communication apparatus may directly determine the first beam hopping pattern without additional steps, thereby simplifying operations at the first communication apparatus.

In a possible implementation, the first beam configuration information includes index information, and the first communication apparatus determines the first beam hopping pattern based on the index information. Specifically, the first communication apparatus stores one or more beam hopping patterns, and selects the first beam hopping pattern from the one or more beam hopping patterns based on the index information.

Compared with specific beam hopping information, an index used in this manner occupies fewer bits. Possibly, the index information may be sent by the second communication apparatus to a terminal by using a user-specific message. Sending the index information to the terminal by using the UE-specific message is more accurate and flexible.

In a possible implementation, the first beam configuration information includes beam pattern change information, and the first communication apparatus determines the first beam hopping pattern based on the beam pattern change information. The beam pattern change information may be beam splitting information or beam combination information.

In this implementation, the first communication apparatus updates a beam hopping pattern based on the beam pattern change information, to determine the first beam hopping pattern, thereby improving accuracy of communication in a beam hopping scenario.

In a possible implementation, that a first communication apparatus communicates with a second communication apparatus based on the first beam hopping pattern includes: The first beam hopping pattern indicates beam activation information of the second communication apparatus; the first communication apparatus determines a start time and an end time of a serving beam based on the beam activation information, where the serving beam is a beam used by the second communication apparatus to serve the first communication apparatus; and the first communication apparatus determines a communication state based on the start time and the end time of the serving beam, where the communication state includes a connected state, an idle state, or an inactive state.

Specifically, the first communication apparatus determines the start time and the end time of the serving beam based on the beam activation information, ephemeris information of a satellite, current location information, and the beam activation information. For example, the first communication apparatus remains in the connected state within the start time to the end time of the serving beam, and switches to the idle state or the inactive state in another time period. In this possible implementation, the first communication apparatus selects a communication occasion and adjusts a communication state based on a beam hopping pattern, so that an effect of reducing power consumption can be achieved.

In a possible implementation, the first beam hopping pattern includes a beam identifier of an active beam. Possibly, the first beam hopping pattern further includes an initial bandwidth part BWP and/or a power compensation coefficient corresponding to the active beam.

The initial BWP is a frequency resource used when a user accesses the beam for the first time, to prevent the first communication apparatus from searching for an access resource when accessing the beam, thereby improving access efficiency. The power compensation coefficient is used to indicate, to the first communication apparatus, a magnitude of a power for transmitting a signal, to avoid an insufficient or excessive power of a signal.

In a possible implementation, the first beam hopping pattern is related to a system frame number SFN. For example, the beam activation information indicated by the first beam hopping pattern corresponds to the system frame number SFN. Specifically, the active beam indicated by the first beam hopping pattern is determined by using mod(SFN, n), where n is a beam hopping pattern change cycle. A beam hopping pattern is associated with a system frame, and the beam hopping pattern is adjusted in a unit of time, thereby facilitating scheduling.

In a possible implementation, the first beam configuration information is determined by a core network device. A core network configures beam hopping information of each access point (the second communication apparatus) in the network, to implement a coordination capability of each access point in the network, and improve communication quality of the entire network.

According to a second aspect, an embodiment of this application further provides a wireless communication method, including: A second communication apparatus sends first beam configuration information to a first communication apparatus, where the first beam configuration information is used to determine a first beam hopping pattern, and the first beam hopping pattern is used by the first communication apparatus to communicate with the second communication apparatus.

In the wireless communication method provided in the second aspect of this application, the second communication apparatus sends the beam configuration information to the first communication apparatus, so that the first communication apparatus determines the first beam hopping pattern, and communicates with the second communication apparatus based on the first beam hopping pattern. In this way, a beam distribution status is delivered to the second communication apparatus in a beam hopping scenario, thereby ensuring normal communication.

In a possible implementation, the second communication apparatus sends a radio resource control RRC message to the first communication apparatus, where the RRC message includes the first beam configuration information.

The RRC message carrying the first beam configuration information may be a message broadcast by the second communication apparatus. The broadcast RRC message carries the first beam configuration information, so that a beam pattern change caused by satellite motion or beam splitting or combination can be flexibly addressed, and signaling overheads can be reduced.

Alternatively, the RRC message carrying the first beam configuration information may be a user-specific (UE-Specific) message unicast by the second communication apparatus to the first communication apparatus. In a scenario with a few users, a unicast RRC message may be used to carry the first beam configuration information, and corresponding beam configuration information may be delivered to each user.

In a possible implementation, the first beam configuration information includes a beam hopping pattern, and the beam hopping pattern is used to determine the first beam hopping pattern.

The first beam configuration information includes a specific beam hopping pattern. After receiving the first beam configuration information, the first communication apparatus may directly determine the first beam hopping pattern without additional steps, thereby simplifying operations at the first communication apparatus.

In a possible implementation, the first beam configuration information includes index information, and the index information is used to determine the first beam hopping pattern.

Compared with specific beam hopping-related information, an index used in this manner occupies fewer bits. Possibly, the second communication apparatus sends the index information by using a user-specific message. Sending the index information to a terminal by using a UE-specific message is more accurate and flexible.

In a possible implementation, the first beam configuration information includes beam hopping pattern change information, and the beam pattern change information is used to determine the first beam hopping pattern. The beam pattern change information may be beam splitting information or beam combination information.

In this implementation, the second communication apparatus sends the beam pattern change information to the first communication apparatus, so that the first communication apparatus updates a beam hopping pattern based on the change information, thereby improving accuracy of communication in a beam hopping scenario.

In a possible implementation, that the first beam hopping pattern is used by the first communication apparatus to communicate with the second communication apparatus includes: The first beam hopping pattern is used to indicate beam activation information of the second communication apparatus; the beam activation information is used to determine a start time and an end time of a serving beam, where the serving beam is a beam used by the second communication apparatus to serve the first communication apparatus; and the start time and the end time of the serving beam are used by the first communication apparatus to switch a communication state, where the communication state includes a connected state, an idle state, or an inactive state.

In this possible implementation, the beam configuration information delivered by the second communication apparatus is used to determine the first beam hopping pattern, so that the first communication apparatus selects a communication occasion and adjusts a communication state based on the beam hopping pattern, and an effect of reducing power consumption can be achieved.

In a possible implementation, the first beam hopping pattern includes a beam identifier of an active beam. Possibly, the first beam hopping pattern may further include an initial bandwidth part BWP corresponding to the active beam and/or a power compensation coefficient corresponding to the active beam.

In a possible implementation, the first beam hopping pattern is related to a system frame number SFN. Specifically, the beam activation information indicated by the first beam hopping pattern is related to the system frame number SFN, including: The active beam, in the first beam hopping pattern, that corresponds to the system frame number is determined by using mod(SFN, n), where n is a beam hopping pattern factor.

In a possible implementation, the first beam configuration information is determined by a core network device. Specifically, the second communication apparatus receives second beam configuration information sent by a core-network network element, and determines, based on the second beam configuration information, the first beam configuration information to be sent to the first communication apparatus.

In this implementation, a core network configures beam hopping information of each access point (the second communication apparatus) in the network, to implement a coordination capability of each access point in the network, and improve communication quality of the entire network.

According to a third aspect, an embodiment of this application further provides a communication apparatus. The communication apparatus may be used in the first communication apparatus in the first aspect. The communication apparatus may be a terminal device, an apparatus (for example, a chip, a chip system, or a circuit) in a terminal device, or an apparatus that can be used with a terminal device. In a possible implementation, the communication apparatus may include modules or units that are in a one-to-one correspondence with and that perform the methods/operations/steps/actions described in the first aspect. The modules or units may be hardware circuits or software, or may be implemented by hardware circuits in combination with software. In a possible implementation, the communication apparatus may include a processing unit and a transceiver unit. The processing unit is configured to invoke the transceiver unit to perform a receiving function and/or a sending function. For example, the transceiver unit is configured to obtain first beam configuration information; and the processing unit is configured to determine a first beam hopping pattern based on the first beam configuration information, and communicate with a second communication apparatus based on the first beam hopping pattern.

In a possible implementation, the transceiver unit is specifically configured to receive a radio resource control RRC message sent by the second communication apparatus, where the RRC message includes the first beam configuration information.

In a possible implementation, the first beam configuration information includes a beam hopping pattern, and the processing unit is configured to determine the first beam hopping pattern based on the beam hopping pattern.

In a possible implementation, the first beam configuration information includes index information, and the processing unit is configured to determine the first beam hopping pattern based on the index information.

In a possible implementation, the first beam configuration information includes beam pattern change information, and the processing unit is configured to determine the first beam hopping pattern based on the beam pattern change information.

In a possible implementation, the first beam hopping pattern indicates beam activation information of the second communication apparatus. The processing unit is configured to determine a start time and an end time of a serving beam based on the beam activation information, where the serving beam is a beam used by the second communication apparatus to serve the first communication apparatus. The processing unit is further configured to determine a communication state based on the start time and the end time of the serving beam, where the communication state includes a connected state, an idle state, or an inactive state.

In a possible implementation, the first beam configuration information is determined by a core network device.

It should be noted that, for beneficial effects of the implementations of the communication apparatus provided in the third aspect of embodiments of this application, reference may be made to the beneficial effects of the wireless communication method in the first aspect. Details are not described herein again.

According to a fourth aspect, an embodiment of this application further provides a communication apparatus. The communication apparatus may be used in the second communication apparatus in the second aspect. The communication apparatus may be a network device, an apparatus (for example, a chip, a chip system, or a circuit) in a network device, or an apparatus that can be used with a network device. In a possible implementation, the communication apparatus may include modules or units that are in a one-to-one correspondence with and that perform the methods/operations/steps/actions described in the second aspect. The modules or units may be hardware circuits or software, or may be implemented by hardware circuits in combination with software. In a possible implementation, the communication apparatus may include a processing unit and a transceiver unit. The processing unit is configured to invoke the transceiver unit to perform a receiving function and/or a sending function. For example, the processing unit is configured to determine first beam configuration information; and the transceiver unit is configured to send the first beam configuration information to a first communication apparatus, where the first beam configuration information is used to determine a first beam hopping pattern, and the first beam hopping pattern is used by the first communication apparatus to communicate with the communication apparatus.

In a possible implementation, the transceiver unit is specifically configured to send a radio resource control RRC message to the communication apparatus, where the RRC message includes the first beam configuration information.

In a possible implementation, the first beam configuration information includes a beam hopping pattern, and the beam hopping pattern is used to determine the first beam hopping pattern.

In a possible implementation, the first beam configuration information includes index information, and the index information is used to determine the first beam hopping pattern.

In a possible implementation, the first beam configuration information includes beam hopping pattern change information, and the beam pattern change information is used to determine the first beam hopping pattern.

In a possible implementation, the first beam hopping pattern includes a beam identifier of an active beam. Possibly, the first beam hopping pattern further includes an initial bandwidth part BWP corresponding to the active beam and/or a power compensation coefficient corresponding to the active beam.

In a possible implementation, the first beam configuration information is determined by a core network device. Specifically, the transceiver unit is further configured to receive second beam configuration information sent by a core-network network element, and the processing unit is further configured to determine the first beam configuration information based on the second beam configuration information.

It should be noted that, for beneficial effects of the implementations of the communication apparatus provided in the third aspect of embodiments of this application, reference may be made to the beneficial effects of the wireless communication method in the first aspect. Details are not described herein again.

According to a fifth aspect, an embodiment of this application further provides a communication apparatus, including a processor, configured to execute computer programs or executable instructions stored in a memory. When the computer programs or the executable instructions are executed, the apparatus is enabled to perform the method in the first aspect and the possible implementations of the first aspect.

In a possible implementation, the processor and the memory are integrated together.

In another possible implementation, the memory is located outside the communication apparatus.

The communication apparatus further includes a communication interface. The communication interface is used by the communication apparatus to communicate with another device, for example, send or receive data and/or signals. For example, the communication interface may be a transceiver, a circuit, a bus, a module, or another type of communication interface.

According to a sixth aspect, an embodiment of this application further provides a communication apparatus, including a processor, configured to execute computer programs or executable instructions stored in a memory. When the computer programs or the executable instructions are executed, the apparatus is enabled to perform the method in the second aspect and the possible implementations of the second aspect.

In a possible implementation, the processor and the memory are integrated together.

In another possible implementation, the memory is located outside the communication apparatus.

The communication apparatus further includes a communication interface. The communication interface is used by the communication apparatus to communicate with another device, for example, send or receive data and/or signals. For example, the communication interface may be a transceiver, a circuit, a bus, a module, or another type of communication interface.

According to a seventh aspect, an embodiment of this application further provides a communication apparatus, including an input/output interface and a logic circuit. The input/output interface is configured to input or output signals or data. The input/output interface is specifically configured to obtain first beam configuration information. The logic circuit is configured to perform the method in any one of the first aspect or the possible implementations of the first aspect to determine a first beam hopping pattern, and is configured to communicate with a second communication apparatus based on the first beam hopping pattern.

In a possible implementation, the input/output interface is further configured to output a random access request.

According to an eighth aspect, an embodiment of this application further provides a communication apparatus, including an input/output interface and a logic circuit. The input/output interface is configured to input or output signals or data. The logic circuit is configured to perform the method in any one of the second aspect or the possible implementations of the second aspect to determine first beam configuration information. The input/output interface is specifically configured to output the first beam configuration information. The first beam configuration information is used to determine a first beam hopping pattern.

In a possible implementation, the input/output interface is further configured to obtain second beam configuration information sent by a core-network network element.

According to a ninth aspect, an embodiment of this application further provides a computer-readable storage medium. The computer-readable storage medium stores a computer program. The computer program is executed by a processor, so that some or all of the steps of the method in any one of the first aspect or the possible implementations of the first aspect, or any one of the second aspect or the possible implementations of the second aspect are performed.

According to a tenth aspect, an embodiment of this application further provides a computer program product including executable instructions. When the computer program product is run on user equipment, some or all of the steps of the method in any one of the first aspect or the possible implementations of the first aspect, or any one of the second aspect or the possible implementations of the second aspect are performed.

According to an eleventh aspect, an embodiment of this application further provides a chip system. The chip system includes a processor, and may further include a memory, and is configured to implement the method in any one of the first aspect or the possible implementations of the first aspect, or any one of the second aspect or the possible implementations of the second aspect. The chip system may include a chip, or include a chip and another discrete device.

BRIEF DESCRIPTION OF DRAWINGS

The following describes some accompanying drawings included in embodiments of this application.

DESCRIPTION OF EMBODIMENTS

Embodiments of this application provide a wireless communication method and apparatus, so that a user can obtain a beam distribution status.

The following describes embodiments of this application with reference to the accompanying drawings in embodiments of this application.

The term "and/or" in this application describes only an association relationship for describing associated objects and represents that three relationships may exist. For example, A and/or B may represent the following three cases: Only A exists, both A and B exist, and only B exists. In the specification and claims in embodiments of this application, the terms "first", "second", and the like are intended to distinguish between different objects but do not indicate a particular order of the objects. For example, a first communication apparatus, a second communication apparatus, and the like are intended to distinguish between different communication apparatuses, but not to describe a particular order of the communication apparatuses. In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner. In the description of the embodiment of this application, unless otherwise stated, "a plurality of" means two or more than two. For example, a plurality of processing units means two or more processing units, and a plurality of systems means two or more systems.

Technical solutions of this application may be used in a non-terrestrial network (NTN) system, for example, a satellite communication system or high altitude platform station (HAPS) communication. The satellite communication system may be integrated with a conventional mobile communication system. For example, the mobile communication system may be a 4th generation (4G) communication system such as a long term evolution (LTE) system or a worldwide interoperability for microwave access (WiMAX) communication system, a 5th generation (5G) communication system such as a new radio (NR) system, or a future mobile communication system.

Figure 1:
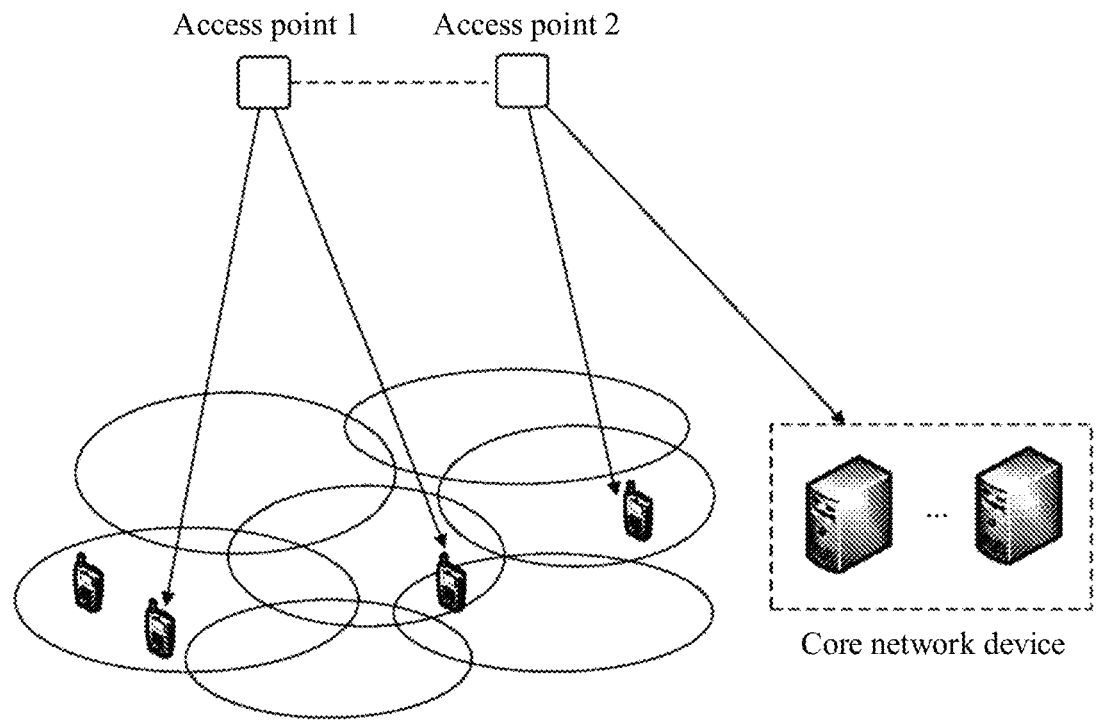
FIG. 1 is a schematic diagram of a communication system according to an embodiment of this application.

FIG. 1 shows an example of a communication system to which an embodiment of this application is applicable. As shown in FIG. 1, an access point covers a service area by using a plurality of beams, and different beams may perform communication through one or more of time division, frequency division, and space division. The access point is not limited to a satellite base station or a terrestrial base station. The access point may be deployed on a high altitude platform station or a satellite. The satellite may be a non-geostationary earth orbit (NGEO) satellite or a geostationary earth orbit (GEO) satellite. Alternatively, the satellite mentioned in this embodiment of this application may be a satellite base station or a network-side device mounted on a satellite.

The access point may be an evolved NodeB (evolutional NodeB, eNB or eNodeB) in LTE, a base station in a 5G network or a future evolved public land mobile network (PLMN), a broadband network gateway (BNG), an aggregation switch, a non-3rd generation partnership project (3GPP) access device, or the like. This is not specifically limited in this embodiment of this application. Optionally, the base station in this embodiment of this application may include base stations in various forms, for example, a macro base station, a micro base station (also referred to as a small cell), a relay station, an access point, a next-generation NodeB (gNodeB, gNB), a transmitting and receiving point (TRP), a transmitting point (TP), a mobile switching center, and a device that performs a function of a base station in device-to-device (D2D), vehicle-to-everything (V2X), or machine-to-machine (M2M) communication. This is not specifically limited in this embodiment of this application.

The access point may communicate and interact with a core network device, and provide a communication service for a terminal device. For example, the core network device is a device in a core network (CN) of a 5G network. As a bearer network, the core network provides an interface for connecting to a data network, provides communication connection, authentication, management, and policy control for user equipment (UE), and carries a data service. The CN may further include network elements such as an access and mobility management function (AMF), a session management function (SMF), an authentication server function (AUSF), a policy control function (PCF), and a user plane function (UPF).

A terminal mentioned in embodiments of this application may be a terminal device, including various devices with a wireless communication function, for example, a handheld device, a vehicle-mounted device, a wearable device, a computing device, or another processing device connected to a wireless modem. The terminal device may be specifically user equipment (UE), an access terminal, a subscriber unit, a subscriber station, a mobile station, a mobile station, a remote station, a remote terminal, a mobile device, a user terminal (terminal equipment), a terminal, a wireless communication device, a user agent, or a user apparatus. Alternatively, the terminal device may be a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a terminal device in a 5G network or a future communication network, or the like. This is not limited in this application.

Figure 2:
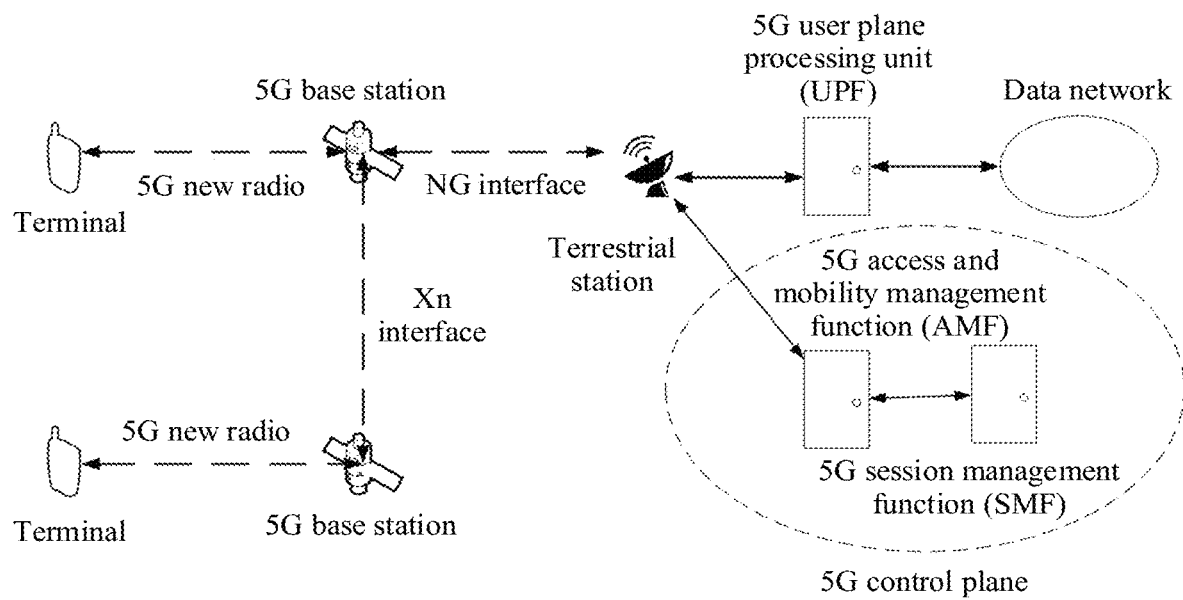
FIG. 2 is a diagram of an application scenario according to an embodiment of this application.

FIG. 2 shows an application scenario to which an embodiment of this application is applicable. The application scenario is specifically a network application architecture in which each member of the 3GPP is integrated with satellite communication and a 5G technology. It should be noted that the application architecture is not construed as a limitation on this application. A communication method provided in embodiments of this application may be further applied to another scenario in which a terrestrial communication system is integrated with satellite communication. A terrestrial mobile terminal accesses a network through 5G new radio. A satellite serves as a 5G base station and is connected to a terrestrial core network through a radio link. In addition, a radio link exists between satellites, to perform signaling interaction and user data transmission between base stations. Network elements in FIG. 2 and their interfaces are described as follows.

Terminal device: a mobile device that supports 5G new radio. The terminal device may access a satellite network through an air interface and initiate services such as calls and Internet access. For example, the terminal device may be the various terminal devices described above. Details are not described herein again.

5G base station: mainly provides a radio access service, schedules a radio resource for an access terminal, provides a reliable radio transmission protocol and data encryption protocol, and the like.

5G core network: provides services such as user access control, mobility management, session management, user security authentication, and charging. The 5G core network includes a plurality of functional units, and may be divided into a control plane function entity and a data plane function entity. An access and mobility management function (AMF) is responsible for user access management, security authentication, and mobility management. A user plane function (UPF) is responsible for managing functions such as user plane data transmission, traffic statistics, and security listening.

Terrestrial station: responsible for forwarding signaling and service data between a satellite base station and the 5G core network.

5G new radio: a radio link between a terminal and a base station.

Xn interface: an interface between 5G base stations, and mainly used for signaling interaction, for example, a handover.

NG interface: an interface between the 5G base station and the 5G core network, and mainly used for exchanging signaling, such as non-access stratum (NAS) signaling of the core network, and service data of a user.

A coverage area of a satellite may reach thousands or even tens of thousands of kilometers, and a coverage area of a beam may reach tens or even thousands of meters. To support wide-area coverage of a satellite, tens, hundreds, or even more beams usually need to be configured for the satellite. To alleviate a contradiction between small single-satellite load and a wide coverage area, beam hopping may be used for area coverage. To be specific, a few beams are configured for a single satellite, and serve a wide coverage area through time division. In a same time unit, only a few beams are used for area coverage, and a wide area is covered by using a plurality of beams used in different time units. In a beam hopping scenario, a terminal needs to obtain a beam distribution status, and perform communication based on a beam distribution.

For the beam hopping scenario, this application provides a wireless communication method and apparatus. A system defines a beam hopping pattern, and delivers the beam hopping pattern to a terminal by using corresponding indication information. The terminal obtains the beam hopping pattern based on the indication information to perform communication, thereby ensuring normal communication of the terminal in the beam hopping scenario. In addition, the terminal may adjust a communication state based on the beam hopping pattern to reduce power consumption.

First, it should be first noted that this application relates to a first communication apparatus and a second communication apparatus. The first communication apparatus may be the foregoing various types of terminals, and the second communication apparatus may be the foregoing various types of network devices. The terminal and the network device are used as examples below for description.

Figure 3:
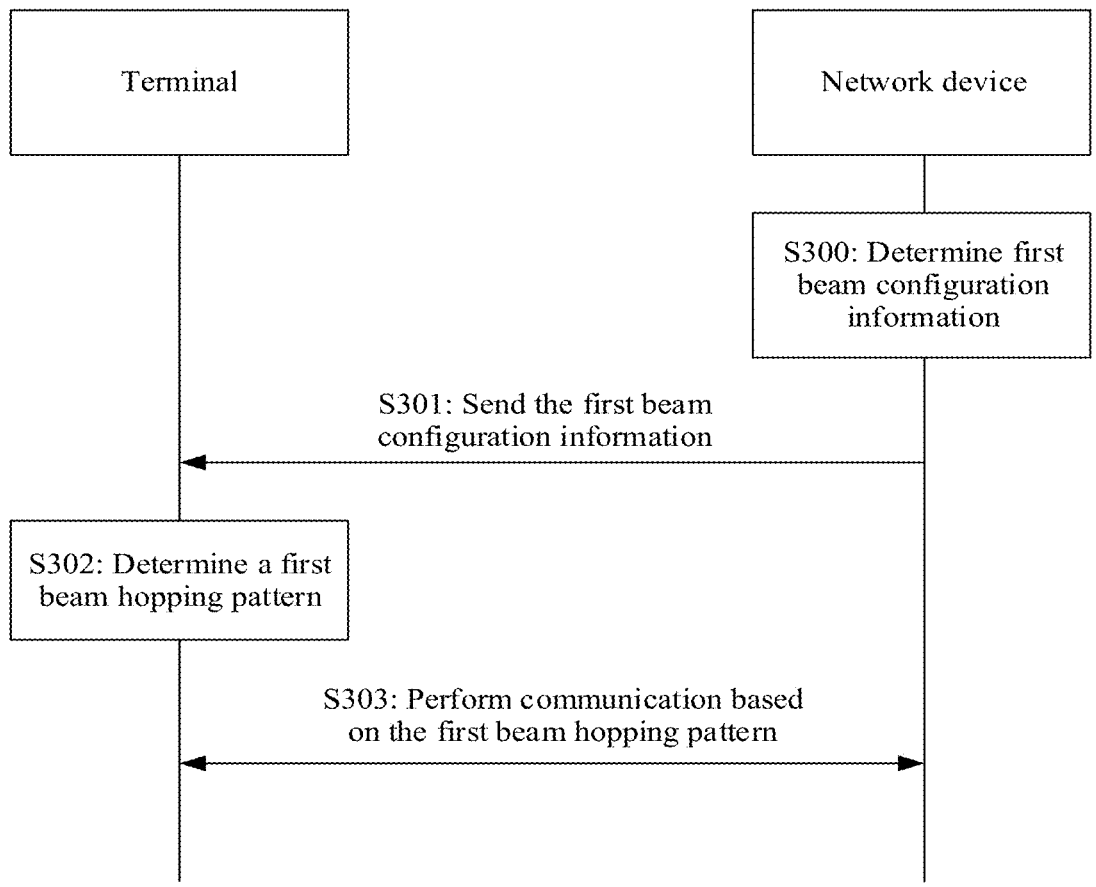
FIG. 3 is a schematic flowchart of a wireless communication method according to an embodiment of this application.

FIG. 3 is a schematic flowchart of a beam indication method according to an embodiment of this application. In this embodiment, a terminal determines a beam hopping pattern based on beam configuration information received from a network device, and communicates with the network device based on the beam hopping pattern.

S300: The network device determines first beam configuration information.

The network device determines the first beam configuration information based on a beam hopping pattern of each beam of the network device.

In a possible implementation, the first beam configuration information is delivered by a core network device. Specifically, a core-network network element sends second beam configuration information to the network device, and the network device receives the second beam configuration information sent by the core-network network element, and determines the first beam configuration information based on the second beam configuration information. Both the first beam configuration information and the second beam configuration information indicate a beam hopping pattern, and representation forms of the configuration information may be the same or different. This is not limited in this application.

In another possible implementation, the first beam configuration information is determined by the network device through negotiation with another network device.

S301: The network device sends the first beam configuration information to the terminal, and correspondingly, the terminal receives the first beam configuration information sent by the network device.

The first beam configuration information may include a specific beam hopping pattern, index information of a beam hopping pattern, or beam pattern change information. Different beam configuration information is described in detail below.

In a possible implementation, the first beam configuration information sent by the network device to the terminal is carried in a radio resource control (RRC) message.

The RRC message carrying the first beam configuration information may be a message broadcast by the network device. In satellite communication, the network device is mobile, the terminal may receive beams transmitted by different network devices at different moments, beam patterns of different network devices are different, and satellite beams may be split or combined. Therefore, the first beam configuration information being carried in the broadcast RRC message is more flexible, and signaling overheads can be reduced.

Alternatively, the RRC message carrying the first beam configuration information may be a user-specific (UE-Specific) message unicast by the network device to the terminal device. In a scenario with a few users, a unicast RRC message may be used to carry the first beam configuration information.

In a possible implementation, the network device periodically delivers the first beam configuration information. For example, the network device broadcasts a system message based on a preconfigured periodicity, where the system message includes the first beam configuration information. The first beam configuration information is periodically delivered, so that scheduling signaling between the network device and the terminal can be reduced.

In a possible implementation, the terminal requests the first beam configuration information from the network device. For example, the network device broadcasts a system message according to a user request. The system message broadcast according to the user request (on demand other system information, ODOSI) is continuously broadcast for two periodicities after a cell is established, and then the broadcast stops. The broadcast starts again after the terminal requests. For example, the terminal triggers, by using a dedicated preamble, the network device to broadcast the ODOSI; or the terminal triggers, by using an RRC system message request message RRC_SYS_INFO_REQ, the network device to broadcast the ODOSI. The network device delivers the first beam configuration information according to the request of the terminal, and does not need to continuously deliver the first beam configuration information, so that broadcast resource overheads can be reduced.

S302: The terminal determines a first beam hopping pattern based on the first beam configuration information.

In a possible implementation, the first beam configuration information includes a beam hopping pattern, and the terminal determines the beam hopping pattern as the first beam hopping pattern.

In a possible implementation, the first beam configuration information includes index information, and the terminal determines the first beam hopping pattern based on the index information.

In a possible implementation, the first beam configuration information includes beam pattern change information, and the terminal determines the first beam hopping pattern based on the change information.

The first beam hopping pattern is used to indicate beam activation information of the network device. The beam activation information may include a beam identifier of an active beam, an initial bandwidth part (BWP) corresponding to the active beam, a power compensation coefficient, and other information. The beam activation information may further include a beam-specific parameter, for example, a timing compensation, a Doppler shift, or a polarization direction. This is not limited in this application.

In a possible implementation, the first beam hopping pattern is related to a system frame number. The beam activation information indicated by the first beam hopping pattern corresponds to the system frame number SFN. Specifically, the active beam indicated by the first beam hopping pattern is determined by using mod(SFN, n), where mod( ) indicates a modulo operation, SFN is the system frame number, and n is a beam hopping pattern change cycle.

S303: The terminal communicates with the network device based on the first beam hopping pattern.

The terminal determines a start time and an end time of a serving beam based on the beam activation information indicated by the first beam hopping pattern, and determines a communication state based on the start time and the end time of the serving beam, where the communication state includes a connected state, an idle state, or an inactive state.

Specifically, the terminal determines the start time and the end time of the serving beam based on the beam activation information, ephemeris information of a satellite, current location information, and the beam activation information.

It should be noted that the terminal may obtain the current location information through positioning, for example, by using a global navigation satellite system (GNSS); and the terminal may obtain the ephemeris information of the satellite by using prestored information or through system broadcast. A manner of obtaining the ephemeris information or the location information is not limited in this application.

For example, the terminal determines, based on the current location information and information, such as a location and a motion law of the satellite, that is included in an ephemeris of the satellite, a time period in which the satellite can provide coverage, and determines, based on the beam activation information indicated by the first beam hopping pattern, a beam distribution status when the satellite provides coverage, to obtain a time period in which one or more serving beams provide a service.

The terminal determines a communication state based on the start time and the end time of the serving beam. For example, the start time and the end time of the serving beam may indicate a time period in which a current location is covered by the serving beam, that is, a service time period of the serving beam. The terminal may remain in the connected state in the service time period of the serving beam, and switch to the idle state or the inactive state in a time period without coverage by the serving beam, that is, a non-service time period. In a possible implementation, when the terminal has a communication requirement, the terminal sends a random access request to the network device at the start time of the service time period of the serving beam.

In the communication method shown in FIG. 3, the network device delivers beam configuration information, and the terminal determines a beam hopping pattern based on the beam configuration information, and communicates with the network device based on the beam hopping pattern. Specifically, the terminal selects a communication occasion and adjusts a communication state based on the beam hopping pattern, to reduce power consumption.

As described in S301, the beam hopping pattern may be indicated in different manners. The following describes in detail a beam configuration method provided in embodiments of this application.

An embodiment of this application provides an RRC signaling-based beam hopping indication method. In the method, each beam in a satellite cell performs a beam hopping operation by using a system frame as a unit. Beam activation information indicated by a beam hopping pattern corresponds to a system frame number.

A network device delivers a beam hopping pattern (hopping_pattern) by broadcasting RRC signaling, where the beam hopping pattern may include parameters such as a beam identifier (beam ID) of an active beam corresponding to a system frame, an initial BWP corresponding to the active beam, and a power compensation system of the active beam.

In an embodiment provided in this application, the network device may deliver beam configuration information based on a system message (system information block, SIB). With reference to the method in FIG. 3, the beam configuration information is the first beam configuration information.

For example, the network device delivers the beam configuration information based on a SIB_BeamConfig message. A specific format is as follows:

```
SIB_BeamConfig ::=                      SEQUENCE {
Hopping Pattern                         SEQUENCE {
    SystemFrame-0           SEQUENCE{
    Active_Beam     SEQUENCE(SIZE(1..maxNrofBeamInCell))OF     BeamId
OPTIONAL, -- Need R
        Active_initial_BWP          SEQUENCE{
        Hopping_BeamId_0        BWP_Id          OPTIONAL, -- Need R
        Hopping_BeamId_1        BWP_Id          OPTIONAL, -- Need R
        Hopping_BeamId_2        BWP_Id          OPTIONAL, -- Need R
        ...
    },
    Power_Adjust                    SEQUENCE{
    Beam0_Power_Adjust      Value           OPTIONAL, -- Need R
    Beam1_Power_Adjust      Value           OPTIONAL, -- Need R
    Beam2_Power_Adjust      Value           OPTIONAL, -- Need R
    ...
    },
    }
    ...
    },
}
BeamId ::=   INTEGER (0.. maxNrofBeamInCell-1)
```

Hopping Pattern indicates a beam hopping pattern, SystemFrame indicates a system frame, and the system frame corresponds to an active beam Active_Beam indicated in the beam hopping pattern. Specifically, the SIB_BeamConfig message further includes a beam identifier of the active beam: BeamId.

It should be noted that, with reference to the method in FIG. 3, Hopping Pattern is the first beam hopping pattern.

In addition, the beam hopping pattern may further include an initial bandwidth part BWP and/or a power compensation coefficient corresponding to the active beam. The initial BWP is a frequency resource used when a user accesses the beam for the first time, to avoid searching for an access resource when the user accesses the beam. The power compensation coefficient is used to indicate, to a terminal, a magnitude of a power for transmitting a signal, to avoid an insufficient or excessive power of a signal.

Specifically, the beam hopping pattern includes an initial BWP identifier BWP_Id corresponding to the active beam identifier Hopping BeamId. For example, Hopping_Beam_Id_0 corresponds to BWP_Id_0, and Hopping_Beam_Id_1 corresponds to BWP_Id_1. The power compensation coefficient corresponding to the active beam is represented by Beam_Power_Adjust and a corresponding value, for example, Beam0_Power_Adjust or Beam1_Power_Adjust.

In a possible implementation, the active beam Active_Beam field may be alternatively expressed in a form of a bit sequence, to reduce bit overheads (fewer fields are used). For example, the following format is used:

```
Hopping Pattern  SEQUENCE {
    SystemFrame-0   SEQUENCE{
    Active_Beam_bitmap BIT
        STRING (SIZE (maxNrofBeamInCell)) OPTIONAL,
        -- Need R
        ...
    }
```

Active_Beam_bitmap is a variable name representing a bit sequence, and BIT STRING (SIZE (maxNrofBeamInCell)) indicates a length of a bit string. The length of the bit string is equal to a total quantity of beams, that is, maxNrofBeamInCell. In this implementation, when a value of a bit is 1, it indicates that a corresponding beam is in an active state, and when a value of a bit is 0, it indicates that a corresponding beam is not activated; or when a value of a bit is 0, it indicates that a corresponding beam is in an active state, and when a value of a bit is 1, it indicates that a corresponding beam is not activated.

In a possible implementation, the beam hopping pattern includes activation information of beams corresponding to a plurality of system frames. In this implementation, the beam configuration information includes more beam hopping-related information, thereby reducing signaling interaction between the network device and the terminal.

In another possible implementation, the beam hopping pattern includes activation information of a beam corresponding to one system frame. In this implementation, a quantity of bits occupied by the beam configuration information can be reduced.

The network device delivers, to the terminal, the beam configuration information including the beam hopping pattern, where the beam activation information indicated by the beam hopping pattern is related to the system frame number. After receiving the beam configuration information delivered by the network device, the terminal determines, based on the system frame number (SFN), the beam activation information indicated by the beam hopping pattern.

For example, the terminal determines, by using mod(SFN, n), the beam activation information indicated by the beam hopping pattern, where n is a beam hopping pattern change cycle.

Figure 4:
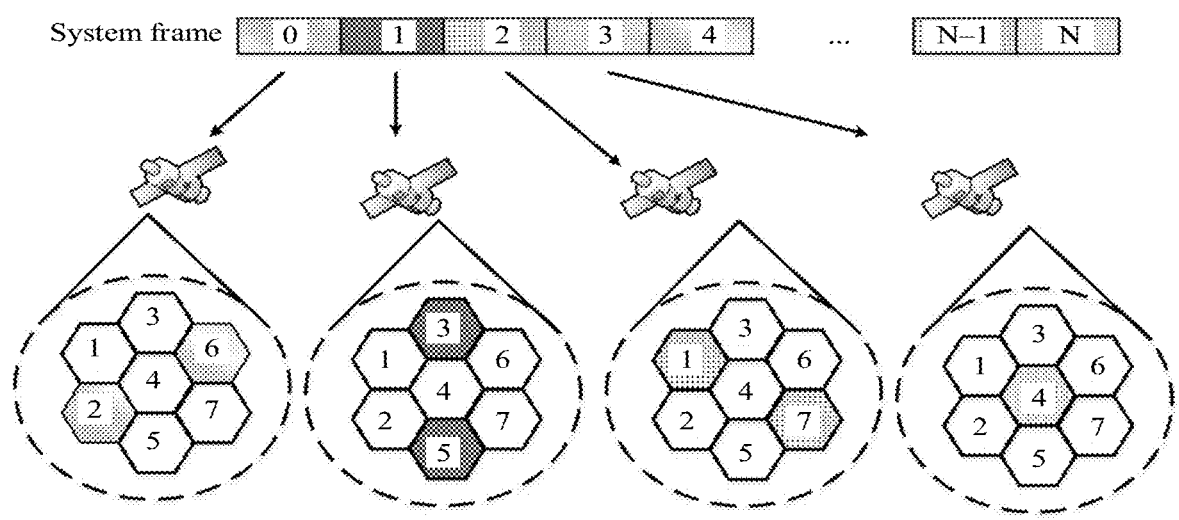
FIG. 4 shows an example of a beam hopping pattern related to a system frame according to an embodiment of this application.

FIG. 4 shows an example of beam hopping indication according to an embodiment of this application. Each beam in a satellite cell performs a beam hopping operation by using a system frame as a unit. As shown in FIG. 4, a system frame 0 corresponds to active beams 2 and 6, a system frame 1 corresponds to active beams 3 and 5, a system frame 2 corresponds to active beams 1 and 7, a system frame 3 corresponds to an active beam 4, a system frame 5 corresponds to active beams 2 and 6, and so on.

A beam hopping pattern shown in FIG. 4 may be represented by using the foregoing SIB_BeamConfig. For example, a specific RRC field is as follows:

```
SIB_BeamConfig ::=                         SEQUENCE {
Hopping Pattern                    SEQUENCE {
  SystemFrame-0       SEQUENCE{
    Active_Beam            (2,6)                OPTIONAL, -- Need R
      Active_initial_BWP         SEQUENCE{
        Hopping_BeamId_0      BWP_Id_0      OPTIONAL, -- Need R
        Hopping_BeamId_1      BWP_Id_1      OPTIONAL, -- Need R
      },
    Power_Adjust                     SEQUENCE{
      Beam0_Power_Adjust      Value1          OPTIONAL, -- Need R
      Beam1_Power_Adjust      Value2          OPTIONAL, -- Need R
      },
  }
  SystemFrame-1       SEQUENCE{
    Active_Beam            (3,5)                OPTIONAL, -- Need R
      Active_initial_BWP         SEQUENCE{
        Hopping_BeamId_0      BWP_Id_0      OPTIONAL, -- Need R
        Hopping_BeamId_1      BWP_Id_1      OPTIONAL, -- Need R
      },
    Power_Adjust                     SEQUENCE{
      Beam0_Power_Adjust      Value1          OPTIONAL, -- Need R
      Beam1_Power_Adjust      Value2          OPTIONAL, -- Need R
      },
  }
  ...
  },
}
```

In the foregoing fields, the system frame 0 SystemFrame-0 corresponds to the active beams 2 and 6: Active_Beam (2,6); and the system frame 1 SystemFrame-1 corresponds to the active beams 3 and 5: Active_Beam (3,5).

After receiving beam configuration information, a terminal determines, based on a system frame number, an active beam indicated by a first beam hopping pattern. For example, the active beam is determined by using mod(SFN, n). In the scenario shown in FIG. 4, n is 4. Therefore, when the SFN is 0, 4, 8, . . . , the terminal determines that the active beam is the beams 2 and 6; or when the SFN is 1, 5, 9, . . . , the terminal determines that the active beam is the beams 3 and 5.

In this embodiment, a network device broadcasts, by using RRC signaling, beam hopping configuration information carrying a beam hopping pattern, to flexibly adapt to scenarios such as satellite movement and beam changes, and reduce signaling overheads. In addition, a beam hopping pattern is associated with a system frame, and the beam hopping pattern is adjusted in a unit of time, thereby facilitating scheduling.

Figure 5:
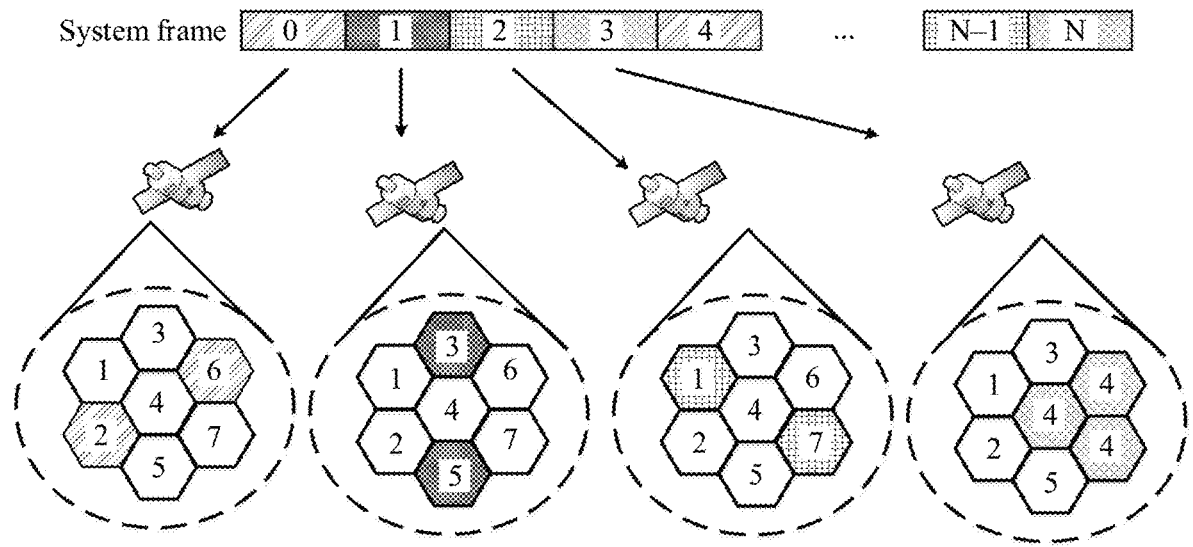
FIG. 5 shows an example of a beam hopping pattern related to a beam change according to an embodiment of this application.

FIG. 5 shows another embodiment of beam hopping indication according to an embodiment of this application. A satellite beam may undergo beam splitting or beam combination. Beam splitting means splitting one beam into two or more beams, and beam combination means combining two or more beams into one beam. In a beam hopping scenario, beam splitting or combination causes a change of a beam hopping pattern. In this embodiment, a network device delivers the beam hopping change to a terminal, so that the terminal updates a beam hopping pattern.

In a possible implementation, the network device may broadcast beam configuration information based on a SIB, and the beam configuration information includes beam hopping pattern change information. For example, the network device delivers, based on a SIB_BeamConfig message, the beam configuration information carrying the beam hopping pattern change. A specific format is as follows:

```
SIB_BeamConfig ::=              SEQUENCE {
  Beam_splitting_combination    SEQUENCE (SIZE (1..maxNrofBeamUpdate)) OF BeamUpdate-Id
    BeamUpdate-Id               SEQUENCE {
      Beam_ID                   Beam_ID;
      Splitting_Combination     CHOICE {
        Splitting               INTEGER (2..max_splitting_factor);
        Combination             SEQUENCE(SIZE(2..max_combination_factor)) OF Beam_ID;
      },
    ...
    }
```

The Beam_splitting_combination field indicates beam splitting/combination. maxNrofBeamUpdate indicates a maximum quantity of updated beams supported by a system. BeamUpdate-Id indicates a beam update identifier. Beam_ID indicates a beam identifier related to splitting or combination. Splitting indicates beam splitting, and one beam may be split into two or more beams. max_splitting_factor indicates a maximum quantity of beams into which a beam can be split. Combination indicates beam combination, and two or more beams may be combined into one beam. max_combination_factor indicates a maximum quantity of beams that can be combined. The CHOICE field indicates that the beam splitting and the beam combination are options, that is, one of them is selected.

It should be noted that values of max_splitting_factor and max_combination_factor may be determined by a manufacturer based on an actual situation, and different manufacturers may use different values.

As shown in FIG. 5, for a system frame number 3, beams 4, 6, and 7 are combined into one beam 4. In this scenario, the beam configuration information that carries the beam hopping pattern change and that is delivered by the network device based on the SIB_BeamConfig message may be as follows:

```
SIB_BeamConfig ::=                    SEQUENCE {
Beam_splitting_combination  SEQUENCE (SIZE
                           (1..maxNrofBeamUpdate)) OF
BeamUpdate-Id
   BeamUpdate-Id                      SEQUENCE {
      Beam_ID                         4;
      Splitting_Combination           CHOICE {
         Combination                  SEQUENCE(SIZE(3)) OF 4,6,7;
   },
   ...
}
```

For example, the beam 4 may be split into two sub-beams (not shown in the figure). In this scenario, the beam configuration information that carries the beam hopping pattern change and that is delivered by the network device based on the SIB_BeamConfig message may be as follows:

```
SIB_BeamConfig ::=                    SEQUENCE {
Beam_splitting_combination  SEQUENCE (SIZE
                           (1..maxNrofBeamUpdate)) OF
BeamUpdate-Id
   BeamUpdate-Id                      SEQUENCE {
      Beam_ID                         4;
      Splitting_Combination           CHOICE {
         Splitting                    INTEGER (2);
   },
   ...
}
```

After receiving the beam configuration information that carries the beam hopping pattern change information and that is delivered by the network device, the terminal updates a beam hopping pattern based on the configuration information, and communicates with the terminal based on an updated beam hopping pattern.

In this embodiment, the network device delivers, to the terminal, the beam configuration information carrying the beam change information, so that the terminal updates the beam hopping pattern after receiving the beam change information, thereby implementing matching between beam parameters on a network side and a terminal side, and ensuring that the terminal performs normal communication based on the beam hopping pattern.

In another embodiment provided in this application, a network device may dynamically indicate a beam hopping pattern. A terminal stores one or more beam hopping patterns, the beam hopping pattern is used to indicate beam activation information, and the one or more beam patterns periodically change. The network device delivers beam configuration information carrying index information, and the terminal determines, from the one or more beam patterns based on the index information, a beam hopping pattern to be used in a next cycle.

For example, as shown in Table 1, two bits may be used to indicate beam hopping indexes that respectively correspond to four beam hopping patterns. A mapping relationship between a beam hopping index and a beam hopping pattern may be specified in a protocol, or may be determined through negotiation between the network device and the terminal.

TABLE 1

| Beam hopping index | Beam hopping pattern |
|---|---|
| 00 | Pattern 1 |
| 01 | Pattern 2 |

TABLE 1-continued

| Beam hopping index | Beam hopping pattern |
|---|---|
| 10 | Pattern 3 |
| 11 | Pattern 4 |

The terminal stores one or more beam hopping patterns. In a possible implementation, the network device sends, to the terminal, configuration information carrying one or more beam hopping patterns. For example, the one or more beam hopping patterns may be configured for the terminal by using an RRC message. Possibly, the one or more beam hopping patterns may be predefined in a protocol, or may be configured by the network device based on an actual situation.

The network device sends, to the terminal, beam configuration information carrying index information, and the terminal receives the beam configuration information that carries the index information and that is sent by the network device. In a possible implementation, the beam configuration information is delivered by using a user-specific (UE-Specific) message. For example, the network device delivers the index information by using downlink control information (DCI). Specifically, a bandwidth part indicator field in the DCI may be reused. For example, the network device may alternatively deliver the index information by using media access control (MAC) layer control signaling: a MAC control element (MAC CE).

The terminal determines, from the one or more beam patterns based on the index information, a beam hopping pattern to be used in a next cycle. Specifically, the terminal determines, based on the index information and the predetermined mapping relationship, the beam hopping pattern to be used in the next cycle.

In this embodiment, the terminal dynamically obtains a beam hopping configuration based on the index information. Compared with a specific beam hopping pattern, the index information occupies fewer bits. In addition, sending the beam configuration information to the terminal by using the UE-specific message is more accurate and flexible.

In still another embodiment provided in this application, beam configuration information sent by a network device to a terminal is determined by a core network. The core network configures beam hopping information to improve a coordination capability of each network device in the network. Specifically, the core network sends second beam hopping configuration information to the network device. After receiving the second beam hopping configuration information, the network device determines first beam hopping configuration information based on the second beam hopping configuration information, and delivers the second beam hopping configuration information to the terminal.

In a possible implementation, a core-network network element transmits beam hopping configuration information by using a next-generation application protocol (NG Application Protocol, NGAP) interface. Specifically, a new beam hopping Beamhopping message is defined, and is used to transmit beam hopping configuration information to the network device.

For example, beam hopping information may be configured by using a message shown in Table 2. The configuration information delivered by the core-network network element may include information elements (IE) such as a system frame number, an active beam identifier (Active_Beam_ID), an active initial BWP (Active_Initial_BWP), and a power compensation (Power_Adjust). The four information elements in Table 2 are mandatory (M) items. In another possible implementation, the power compensation may be an optional item. The system frame number may range from 0 to 1023, or may be in another range. The active beam identifier ranges from 1 to maxNrofBeamInCell, where maxNrofBeamInCell indicates a maximum quantity of beams in a cell. The configuration information may further include another information element. This is not limited in this application.

It should be noted that assigned criticality shown in Table 2 indicates a processing manner to be used when a corresponding information element cannot be interpreted, and may be rejecting (Reject IE), ignoring and notifying a sender (Ignore IE and Notify Sender), or ignoring (Ignore). In a possible implementation, assigned criticality corresponding to the information elements shown in Table 2 is "Ignore".

In some possible implementations, the configuration message delivered by the core-network network element includes some columns in Table 2, or another column is added based on Table 2. This is not limited in this application.

TABLE 2

| Information element group/Name (IE Group/Name) | Presence | Range | Information element type and reference (IE type and Reference) | Semantics description | Criticality | Assigned criticality |
| --- | --- | --- | --- | --- | --- | --- |
| System frame number | M (Mandatory) | 0 to 1023 | Integer (0..1023) | | Yes | |
| Activated beam identifier (Active_Beam_ID) | M (Mandatory) | 1 to maxNrof BeamIn Cell | BIT STRING (SIZE(10)) | | Yes | |
| Active initial BWP (Active_Initial_BWP) | M (Mandatory) | | | Initial BWP identifier of a current beam | Yes | |
| Power compensation (Power_Adjust) | M (Mandatory) | | | Power parameter of the current beam | Yes | |
| ... | | | | | | |

In another possible implementation, the beam configuration information delivered by the network device to the terminal may be alternatively determined through negotiation between network devices in the network. The network devices perform negotiation by using an Xn application protocol (XnAP) interface.

In this embodiment, the beam configuration information delivered by the network device to the terminal is determined by the core network or determined through negotiation between network devices in the network, thereby improving a coordination capability of each network device in the network.

To implement the functions in the method provided in the foregoing embodiments of this application, the terminal device and the network device each may include a hardware structure and/or a software module, to implement the foregoing functions in a form of a hardware structure, a software module, or a combination of a hardware structure and a software module. Whether one of the foregoing functions is performed in the manner of a hardware structure, a software module, or a hardware structure and a software module depends on a specific application and design constraints of the technical solutions.

Figure 6:
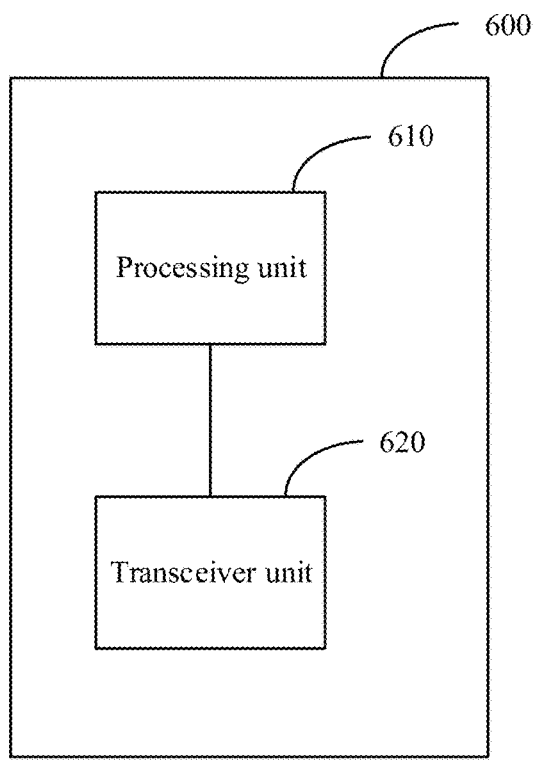
FIG. 6 is a schematic diagram of a structure of a communication apparatus according to an embodiment of this application.

As shown in FIG. 6, based on a same technical concept, an embodiment of this application further provides a communication apparatus 600. The communication apparatus 600 may be a terminal or a network device, namely, a first communication apparatus or a second communication apparatus, an apparatus in a terminal device or a network device, or an apparatus that can be used with a terminal device or a network device. In a possible implementation, the communication apparatus 600 may include modules or units that are in a one-to-one correspondence with and that perform the methods/operations/steps/actions performed by the terminal in the foregoing method embodiments. The units may be hardware circuits or software, or may be implemented by hardware circuits in combination with software. In a possible implementation, the communication apparatus 600 may include a processing unit 610 and a transceiver unit 620. The processing unit 610 may be configured to invoke the transceiver unit 620 to perform a receiving function and/or a sending function.

When the communication apparatus 600 is configured to perform the operations performed by the terminal, namely, the first communication apparatus, the transceiver unit 620 is configured to obtain first beam configuration information; and the processing unit 610 is configured to determine a first beam hopping pattern based on the first beam configuration information, and communicate with the second communication apparatus based on the first beam hopping pattern.

When the communication apparatus 600 is configured to perform the operations performed by the network device, namely, the second communication apparatus, the processing unit 610 is configured to determine first beam configuration information; and the transceiver unit 620 is configured to send the first beam configuration information to a first communication apparatus, where the first beam configuration information is used to determine a first beam hopping pattern, and the first beam hopping pattern is used by the first communication apparatus to communicate with the communication apparatus.

The transceiver unit 620 is further configured to perform another receiving or sending step or operation performed by the terminal or the network device in the foregoing method embodiments. The processing unit 610 may be further configured to perform a corresponding step or operation, other than receiving and sending, that is performed by the terminal and the network device in the foregoing method embodiments. Details are not described herein again.

Division into the modules in embodiments of this application is an example, is merely division into logical functions, and may be other division during actual implementation. In addition, functional modules or units in embodiments of this application may be integrated into one processor, or may exist alone physically, or two or more modules or units may be integrated into one module or unit. The integrated module or unit may be implemented in a form of hardware, or may be implemented in a form of a software functional module.

Figure 7:
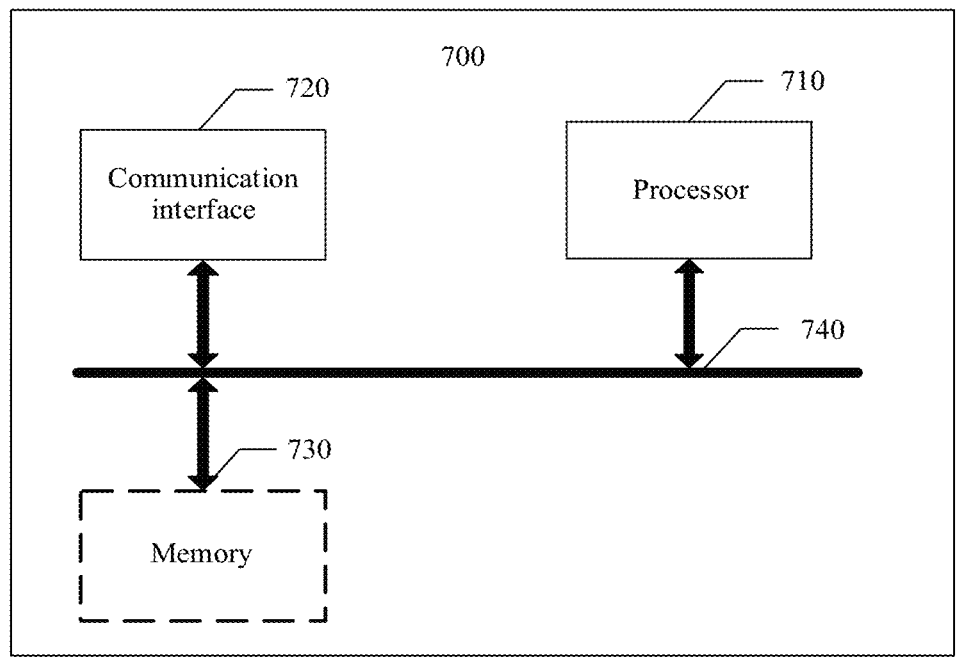
FIG. 7 is a schematic diagram of a structure of another communication apparatus according to an embodiment of this application.

With reference to FIG. 7, an embodiment of this application further provides a communication apparatus 700, configured to implement the functions of the terminal or the network device in the foregoing method, namely, the functions of the first communication apparatus or the second communication apparatus. The communication apparatus may be a terminal or a network device, an apparatus in a terminal or a network device, or an apparatus that can be used with a terminal or a network device. The communication apparatus 700 may be a chip system. In this embodiment of this application, the chip system may include a chip, or may include the chip and another discrete device. The communication apparatus 700 includes at least one processor 710, configured to implement the functions of the terminal or the network device in the method provided in embodiments of this application. The communication apparatus 700 may further include a communication interface 720. In this embodiment of this application, the communication interface may be a transceiver, a circuit, a bus, a module, or another type of communication interface, and is configured to communicate with another device by using a transmission medium. For example, the communication interface 720 is used by an apparatus in the communication apparatus 700 to communicate with another device.

The processor 710 may perform the functions performed by the processing unit 610 in the communication apparatus 600. The communication interface 720 may be configured to perform the functions performed by the transceiver unit 620 in the communication apparatus 600.

When the communication apparatus 700 is configured to perform the operations performed by the terminal, the communication interface 720 is configured to obtain first beam configuration information; and the processor 710 is configured to determine a first beam hopping pattern based on the beam configuration information, and communicate with a second communication apparatus (a network device) based on the determined first beam hopping pattern.

When the communication apparatus 700 is configured to perform the operations performed by the network device, the processor 710 is configured to determine first beam configuration information; and the communication interface 720 is configured to send the first beam configuration information to a first communication apparatus (a terminal), where the first beam configuration information is used to determine a first beam hopping pattern, and the first beam hopping pattern is used by the first communication apparatus to communicate with the communication apparatus.

The communication interface 720 is further configured to perform another receiving or sending step or operation performed by the terminal or the network device in the foregoing method embodiments. The processor 710 may be further configured to perform a corresponding step or operation, other than receiving and sending, that is performed by the terminal and the network device in the foregoing method embodiments. Details are not described herein again.

The communication apparatus 700 may further include at least one memory 730, configured to store program instructions and/or data. The memory 730 is coupled to the processor 710. The coupling in this embodiment of this application is indirect coupling or a communication connection between apparatuses, units, or modules for information exchange between the apparatuses, the units, or the modules, and may be in electrical, mechanical, or other forms. The processor 710 and the memory 730 may perform an operation cooperatively. The processor 710 may execute the program instructions stored in the memory 730. In a possible implementation, at least one of the at least one memory may be integrated with the processor. In another possible implementation, the memory 730 is located outside the communication apparatus 700.

In this embodiment of this application, a specific connection medium between the communication interface 720, the processor 710, and the memory 730 is not limited. In this embodiment of this application, in FIG. 7, the memory 730, the processor 710, and the communication interface 720 are connected by using a bus 740. The bus is represented by a bold line in FIG. 7. A connection manner between other components is described merely as an example and does not constitute a limitation. The bus may be classified into an address bus, a data bus, a control bus, and the like. For ease of representation, only one bold line is used for representation in FIG. 7, but this does not mean that there is only one bus or only one type of bus.

In this embodiment of this application, the processor 710 may be one or more central processing units (CPU). When the processor 710 is one CPU, the CPU may be a single-core CPU or a multi-core CPU. The processor 710 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of the present invention. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In this embodiment of this application, the memory 730 may include but is not limited to a non-volatile memory such as a hard disk drive (HDD) or a solid-state drive (SSD), a random access memory (RAM), an erasable programmable read-only memory (Erasable Programmable ROM, EPROM), a read-only memory (ROM), a compact disc read-only memory (CD-ROM), and the like. The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Figure 8:
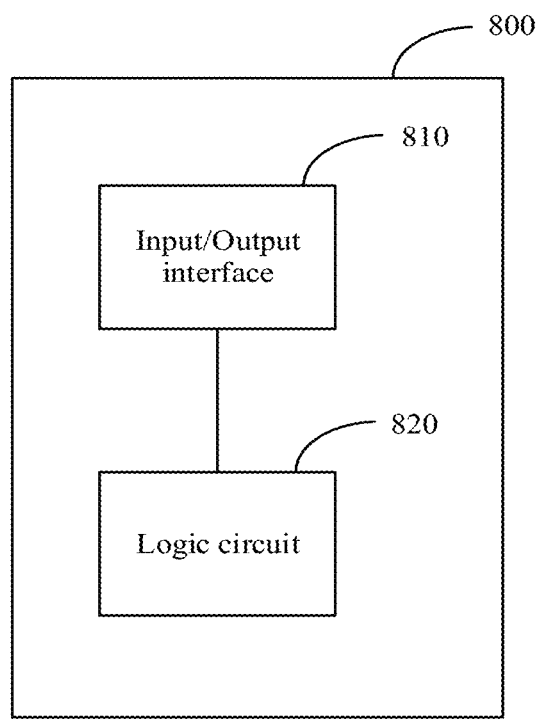
FIG. 8 is a schematic diagram of a structure of still another communication apparatus according to an embodiment of this application.

With reference to FIG. 8, an embodiment of this application further provides an apparatus 800 that may be configured to implement the functions of the terminal or the network device in the foregoing method. The apparatus 800 may be a communication apparatus or a chip in a communication apparatus. The communication apparatus includes:

at least one input/output interface 810 and a logic circuit 820, where the input/output interface 810 may be an input/output circuit, and the logic circuit 820 may be a signal processor, a chip, or another integrated circuit capable of implementing the method of this application.

The at least one input/output interface 810 is configured to input or output signals or data. For example, when the apparatus is a terminal or is used in a terminal, the input/output interface 810 is configured to obtain first beam configuration information, and the input/output interface 810 may be further configured to output a random access request. For example, when the apparatus is a network device or is used in a network device, the input/output interface 810 is configured to output first beam configuration information, and the input/output interface 810 may be further configured to obtain second beam configuration information sent by a core-network network element.

The logic circuit 820 is configured to perform some or all steps of any method provided in embodiments of this application. The logic circuit may implement the functions implemented by the processing unit 610 in the apparatus 600 or the processor 710 in the apparatus 700. For example, when the apparatus is a terminal or is used in a terminal, the apparatus is configured to perform the steps performed by the terminal (the first communication apparatus) in various possible implementations in the foregoing method embodiments. For example, the logic circuit 820 is configured to determine a first beam hopping pattern based on the first beam configuration information. When the apparatus is a network device or is used in a network device, the apparatus is configured to perform the steps performed by the network device (the second communication apparatus) in various possible implementation methods in the foregoing method embodiments. For example, the logic circuit 820 is configured to determine the first beam configuration information.

When the communication apparatus is a chip used in a terminal, the chip of the terminal implements the functions of the terminal in the foregoing method embodiments. The chip of the terminal receives information from another module (for example, a radio frequency module or an antenna) in the terminal, where the information is sent by a network device to the terminal; or the chip of the terminal sends information to another module (for example, a radio frequency module or an antenna) in the terminal, where the information is sent by the terminal to a network device.

When the communication apparatus is a chip used in a network device, the chip of the network device implements the functions of the network device in the foregoing method embodiments. The chip of the network device receives information from another module (for example, a radio frequency module or an antenna) in the network device, where the information is sent by a terminal to the network device; or the chip of the network device sends information to another module (for example, a radio frequency module or an antenna) in the network device, where the information is sent by the network device to a terminal.

Based on a concept same as that of the method embodiments, an embodiment of this application further provides a computer-readable storage medium. The computer-readable storage medium stores a computer program. The computer program is executed by hardware (for example, a processor), to implement some or all steps of any method performed by any apparatus in embodiments of this application.

Based on a concept same as that of the method embodiments, an embodiment of this application further provides a computer program product including instructions. When the computer program product is run on a computer, the computer is enabled to perform some or all steps of any method in the foregoing aspects.

Based on a concept same as that of the method embodiments, this application further provides a chip or a chip system. The chip may include a processor. The chip may further include a memory (or a storage module) and/or a transceiver (or a communication module); or the chip is coupled to a memory (or a storage module) and/or a transceiver (or a communication module). The transceiver (or the communication module) may be configured to support the chip in wired and/or wireless communication. The memory (or the storage module) may be configured to store a program. The processor may be configured to invoke the program to implement the operations performed by the terminal or the network device in any one of the method embodiments or the possible implementations of the method embodiments. The chip system may include the chip, or may include the chip and another discrete device, for example, a memory (or a storage module) and/or a transceiver (or a communication module).

Based on a concept same as that of the method embodiments, this application further provides a communication system. The communication system may include the foregoing terminal and/or network device. The communication system may be configured to implement the operations performed by the terminal or the network device in any one of the method embodiments or the possible implementations of the method embodiments. For example, the communication system may have the structure shown in FIG. 1 or FIG. 2.

All or some of the foregoing embodiments may be implemented using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, descriptions of embodiments have respective focuses. For a part that is not described in detail in an embodiment, refer to related description in other embodiments. In the foregoing embodiments, descriptions of embodiments have respective focuses. For a part that is not described in detail in an embodiment, refer to related description in other embodiments.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, in other words, may be located in one position, or may be distributed on a plurality of network units. Some or all of the units may be selected according to actual needs to achieve the objectives of the solutions of embodiments.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application.

The foregoing descriptions are merely some specific implementations of this application, but the protection scope of this application is not limited thereto. Any person skilled in the art may make additional changes and modifications to these embodiments within the technical scope disclosed in this application. Therefore, the appended claims are intended to be construed as including the foregoing embodiments and all changes and modifications that fall within the scope of this application. Therefore, the protection scope of this application shall be subject to the protection scope of the claims.

What is claimed is:

1. A wireless communication method, comprising:
   obtaining, by a first communication apparatus, first beam configuration information;
   determining a first beam hopping pattern based on the first beam configuration information, wherein the first beam hopping pattern indicates beam activation information of a second communication apparatus; and
   communicating with the second communication apparatus based on the first beam hopping pattern.

2. The method according to claim 1, wherein the obtaining, by a first communication apparatus, first beam configuration information comprises:
   receiving, by the first communication apparatus, a radio resource control (RRC) message sent by the second communication apparatus, wherein the RRC message comprises the first beam configuration information.

3. The method according to claim 1, wherein the determining a first beam hopping pattern based on the first beam configuration information comprises:
   the first beam configuration information comprises a beam hopping pattern; and
   determining, by the first communication apparatus, the first beam hopping pattern based on the beam hopping pattern.

4. The method according to claim 1, wherein the determining a first beam hopping pattern based on the first beam configuration information comprises:
   the first beam configuration information comprises index information; and
   determining, by the first communication apparatus, the first beam hopping pattern based on the index information.

5. The method according to claim 1, wherein the determining a first beam hopping pattern based on the first beam configuration information comprises:
   the first beam configuration information comprises beam pattern change information; and
   determining, by the first communication apparatus, the first beam hopping pattern based on the beam pattern change information.

6. The method according to claim 1, wherein the communicating with a second communication apparatus based on the first beam hopping pattern comprises:
   determining, by the first communication apparatus, a start time and an end time of a serving beam based on the beam activation information, wherein the serving beam is a beam that serves communications with the first communication apparatus; and
   determining a communication state based on the start time and the end time of the serving beam, wherein the communication state comprises a connected state, an idle state, or an inactive state.

7. The method according to claim 1, wherein
   the first beam hopping pattern comprises a beam identifier of an active beam.

8. The method according to claim 7, wherein
the first beam hopping pattern further comprises at least one of an initial bandwidth part (BWP) or a power compensation coefficient corresponding to the active beam.

9. The method according to claim 7, wherein
the first beam hopping pattern is related to a system frame number (SFN).

10. The method according to claim 9, wherein
the active beam indicated by the first beam hopping pattern is determined by using mod (SFN, n), wherein n is a beam hopping pattern change cycle.

11. The method according to claim 1, wherein
the first beam configuration information is determined by a core network device.

12. A wireless communication method, comprising:
determining, by a second communication apparatus, first beam configuration information; and
sending, by the second communication apparatus, the first beam configuration information to a first communication apparatus, wherein
the first beam configuration information is used to determine a first beam hopping pattern that indicates beam activation information; and
the first beam hopping pattern is used to communicate with the second communication apparatus.

13. The method according to claim 12, wherein the sending, by the second communication apparatus, the first beam configuration information to a first communication apparatus comprises:
sending, by the second communication apparatus, a radio resource control (RRC) message to the first communication apparatus, wherein the RRC message comprises the first beam configuration information.

14. The method according to claim 12, wherein that the first beam configuration information is used to determine a first beam hopping pattern comprises:
the first beam configuration information comprises a beam hopping pattern; and
the beam hopping pattern is used to determine the first beam hopping pattern.

15. The method according to claim 12, wherein that the first beam configuration information is used to determine a first beam hopping pattern comprises:
the first beam configuration information comprises index information; and
the index information is used to determine the first beam hopping pattern.

16. The method according to claim 12, wherein that the first beam configuration information is used to determine a first beam hopping pattern comprises:
the first beam configuration information comprises beam hopping pattern change information; and
the beam pattern change information is used to determine the first beam hopping pattern.

17. The method according to claim 12, wherein that the first beam hopping pattern is used to communicate with the second communication apparatus comprises:
the beam activation information is used to determine a start time and an end time of a serving beam, wherein the serving beam is a beam used to serve the first communication apparatus; and
the start time and the end time of the serving beam are used to switch a communication state, wherein
the communication state comprises a connected state, an idle state, or an inactive state.

18. The method according to claim 12, wherein
the first beam hopping pattern comprises a beam identifier of an active beam.

19. The method according to claim 18, wherein
the first beam hopping pattern further comprises at least one of an initial bandwidth part (BWP) corresponding to the active beam or a power compensation coefficient of the active beam.

20. A first communication apparatus, comprising:
at least one processor; and
one or more memories coupled to the at least one processor and storing programming instructions for execution by the at least one processor to cause the first communication apparatus to:
obtain first beam configuration information;
determine a first beam hopping pattern based on the first beam configuration information, wherein the first beam hopping pattern indicates beam activation information of a second communication apparatus; and
communicate with a second communication apparatus based on the first beam hopping pattern.

* * * * *